United States Patent [19]

Timm

[11] 4,019,304
[45] Apr. 26, 1977

[54] METHOD OF TEMPORARILY WATER-PROOFING PARTS OF BUILDINGS IN ANTICIPATION OF FLOODS

[76] Inventor: Rolando E. Timm, 628 Aldee Lane, Gretna, La. 70053

[22] Filed: Oct. 29, 1975

[21] Appl. No.: 626,699

[52] U.S. Cl. .............................. 52/746; 52/169.5; 52/202; 137/357; 156/71
[51] Int. Cl.² .......................................... E04H 9/14
[58] Field of Search ............ 52/169, 741, 390, 746, 52/748, 202; 137/357; 138/93; 156/71

[56] References Cited

UNITED STATES PATENTS

| 391,862 | 10/1888 | Ritter | 52/367 X |
| 2,145,284 | 1/1939 | Anderson et al. | 52/169 |
| 2,930,396 | 3/1960 | Weisman et al. | 137/357 |
| 3,270,473 | 9/1966 | Smith | 52/390 |

OTHER PUBLICATIONS

Construction Methods, p. 87 Mar. 1955.

Primary Examiner—Alfred C. Perham
Attorney, Agent, or Firm—James B. Lake, Jr.

[57] ABSTRACT

Sealing a building with flexible plastic sheets continuously wrapped and sealed therearound from base to above anticipated flood height. All glassed openings are covered with plywood before wrapping building, and drains below anticipated flood height are closed with inflatable bladders. Main application is to slab houses and wharehouses.

3 Claims, 3 Drawing Figures

METHOD OF TEMPORARILY WATER-PROOFING PARTS OF BUILDINGS IN ANTICIPATION OF FLOODS

BACKGROUND OF THE INVENTION

1. Field of the Invention

The invention relates generally to flood protection of buildings and more particularly to a method of temporarily protecting any type of buildings and wharehouses from anticipated flooding.

2. Description of the Prior Art

A search in the Patent Office Search Room by the inventor revealed no prior art.

SUMMARY OF THE INVENTION

An object of the invention is to provide a method of temporarily waterproofing slab based buildings from anticipated flooding.

Another object of the invention is to temporarily seal a an entire lower part of a building from the base up to more than the anticipated height of flooding and to seal off all drainage lines below said anticipated height of flooding.

Another object of the invention is to reinforce all glassed-in opening in said building below said anticipated flooding heights.

Other objects and a clearer understanding of the invention can be obtained by reading the following specification and drawings.

DETAILED DESCRIPTION

Figure 1:
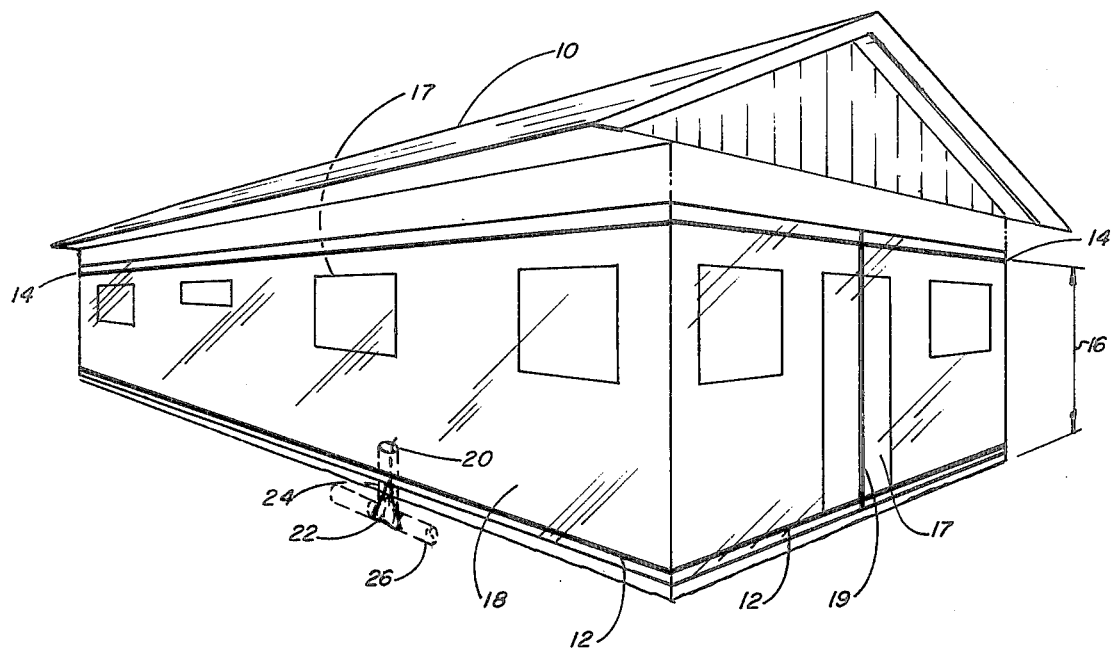
FIG. 1 is a perspective view of a building protected from flooding according to the method of the invention.
Figure 3:
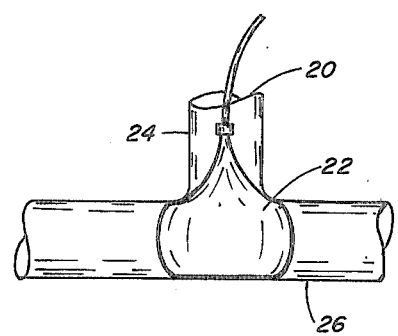
FIG. 3 is a partial side view of a blatter sealed drain.

Referring to FIG. 1 the method of the invention for preparing a building 10 for temporary flooding comprises the steps of applying a continuous strip of waterproofed tape 12, having sealing material on both sides of the tape around the bottom of building 10, and another similar strip 14 around building 10 parallel to the first strip and spaced vertically therefrom by more than the anticipated height 16 of possible flooding. The tape is sealed to the building 10 by sealing material on one side of the tapes. All openings between tapes 12 and 14 are covered with plywood coverings 17. A sheet 18 of flexible plastic sheeting such as vinyl is prepared by sealing together a plurality of available pieces of vinyl to extend continuously and horizontally around building 10 from tape 12 to tape 14 vertically. The top and bottom of sheet 18 is pressed against the sealing material on other and outer sides the two tapes to form a smooth unwrinkled band of vinyl around said building, thereby horizontally sealing it to above the expected height of flooding. The meeting ends sheet 19 of sheet 18 can be heat sealed or sealed with waterproof tape having one side of sealing material for application thereto. Referring to FIG. 3 all drains 20 opening inside structure 10 between tapes 12 and 14 are sealed by inserting bladders 22 therein and inflating to seal the riser pipes 24 to openings from the lower drain pipes 26 outside structure 10.

The method thereby temporarily water seals a building from its base to above expected flood levels and prevents all water damage to its interior and contents. When the base is raised on spaced apart foundations, the spaces between foundations are treated as openings into the building and are closed with plywood and plastic as explained for windows and oors.

The height to which a building can be waterproofed is, of course, a function of its structural strength, that is of the strength of the walls against collapsing against the external pressure of a height of water.

Figure 2:
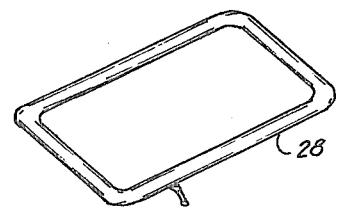
FIG. 2 is a reduced perspective of a pneumatic belt.

Taped areas of the vinyl sheet can be reinforced with a pneumatic belt 28 which is wrapt around the taped area and inflated. (See FIG. 2).

What is claimed is:

1. Method of temporarily waterproofing parts of a building in anticipation of floods comprising the steps of:
   a. Sealing a continuous strip of waterproof tape around bottom of building, said tape having both sides coated with sealing, and sealing to said building by means of one coated side;
   b. sealing a similar tape exteriorly around said building spaced vertically upward from said first tape more than the expected height of flooding;
   c. inserting bladders in junctions of drains opening interiorly between said tapes;
   d. covering with plywood all exterior openings in in and below said building; and
   e. wrapping a continuous sheet of flexible plastic around said building that extends between said tapes and seals thereto by the irrespective second sides; and
   f. sealing the ends of said continuous sheet with waterproof sealing means.

2. The method of claim 1 wherein said sealing with said sealing means comprises the step of: applying waterproof tape thereto.

3. The method of claim 1 wherein said sealing with said sealing means comprises the steps of: overlapping said ends and applying heat thereto.

* * * * *